(12) United States Patent
Arrasvuori

(10) Patent No.: US 8,826,182 B2
(45) Date of Patent: Sep. 2, 2014

(54) METHOD AND APPARATUS FOR PROVIDING A MULTI-DIMENSIONAL INPUT

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 168 days.

(21) Appl. No.: 13/224,922

(22) Filed: Sep. 2, 2011

(65) Prior Publication Data

US 2013/0061181 A1 Mar. 7, 2013

(51) Int. Cl.
*G06F 17/30* (2006.01)

(52) U.S. Cl.
USPC ........... 715/836; 715/764; 715/835; 715/837; 707/765; 707/766

(58) Field of Classification Search
None
See application file for complete search history.

(56) References Cited

U.S. PATENT DOCUMENTS

| | | | |
|---|---|---|---|
| 7,698,267 B2 | 4/2010 | Papakonstantinou et al. | |
| 7,856,413 B2 | 12/2010 | Cradick et al. | |
| 2008/0104040 A1 | 5/2008 | Ramakrishna | |
| 2009/0164948 A1* | 6/2009 | Kramer | 715/856 |
| 2009/0192703 A1 | 7/2009 | Hess et al. | |
| 2011/0083078 A1 | 4/2011 | Ju | |
| 2011/0099180 A1 | 4/2011 | Arrasvuori | |

FOREIGN PATENT DOCUMENTS

WO WO 2010/057531 A1 5/2010

OTHER PUBLICATIONS

"How to Draw a Circle and Search within the Circle on a Google Maps API" Stackoverflow, Asked Jul. 28, 2010 by Laurenz, http://stackedoverflow.com/questions/3351016/how-to-draw-a-circle-and-search-within-the-circle-on-a-google-maps-api.
Search-Cube—The Visual Search Engine, Retrieved: Dec. 22, 2011, http://www.search-cube.com/.

* cited by examiner

*Primary Examiner* — Stephen Hong
*Assistant Examiner* — Keith Bloomquist
(74) *Attorney, Agent, or Firm* — Ditthavong Mori & Steiner, P.C.

(57) ABSTRACT

An approach is provided for generating a multi-dimensional input. A user interface platform causes, at least in part, a mapping of one or more parameters, one or more representations of the one or more parameters, or a combination thereof onto one or more respective surface segments of at least one three-dimensional icon. The user interface platform then causes, at least in part, a rendering of the at least one three-dimensional icon in a user interface. The user interface platform then determines one or more manipulations of the at least one three-dimensional icon in the user interface, and processes and/or facilitates a processing of the one or more manipulations to determine one or more weighting values for the one or more parameters.

16 Claims, 12 Drawing Sheets

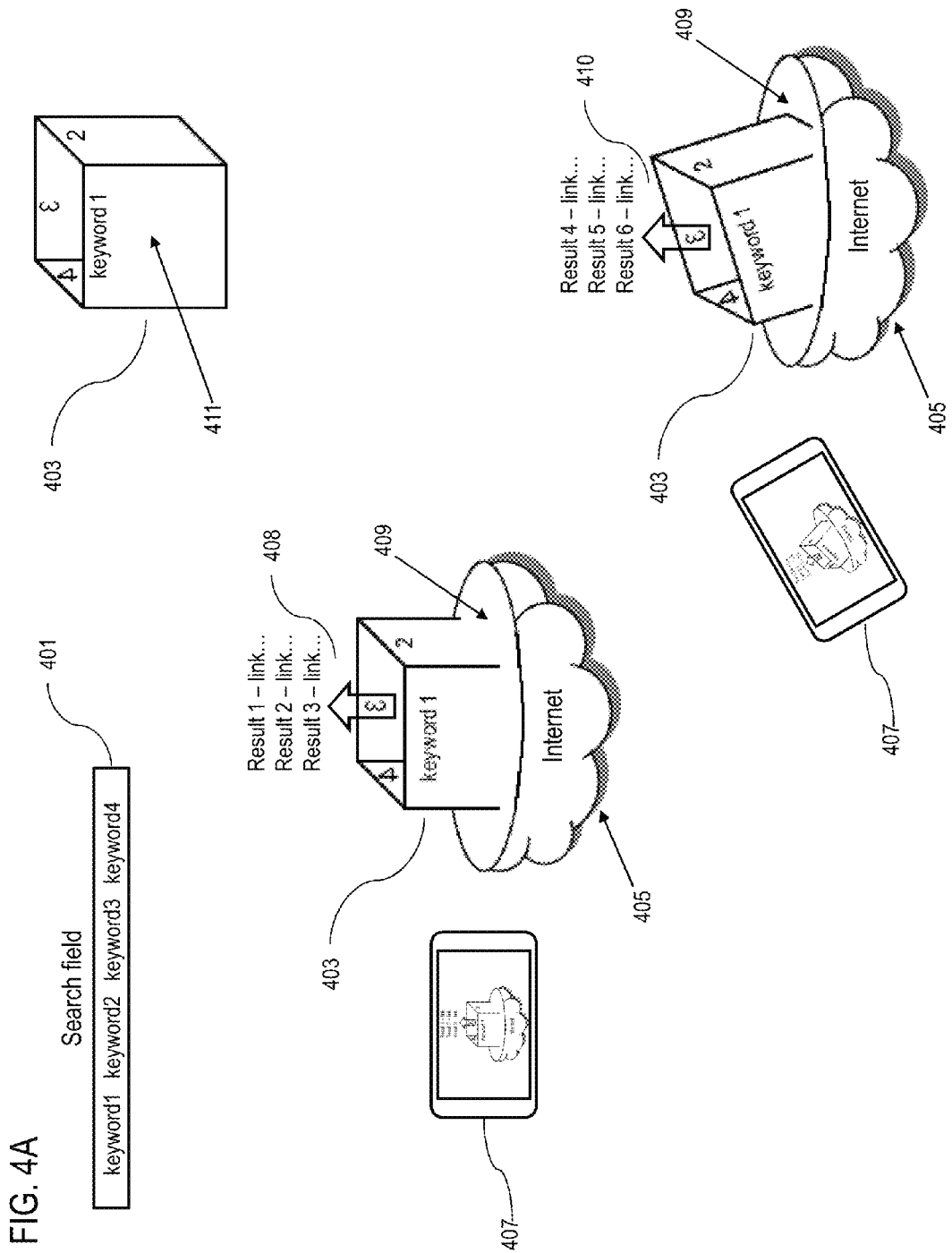

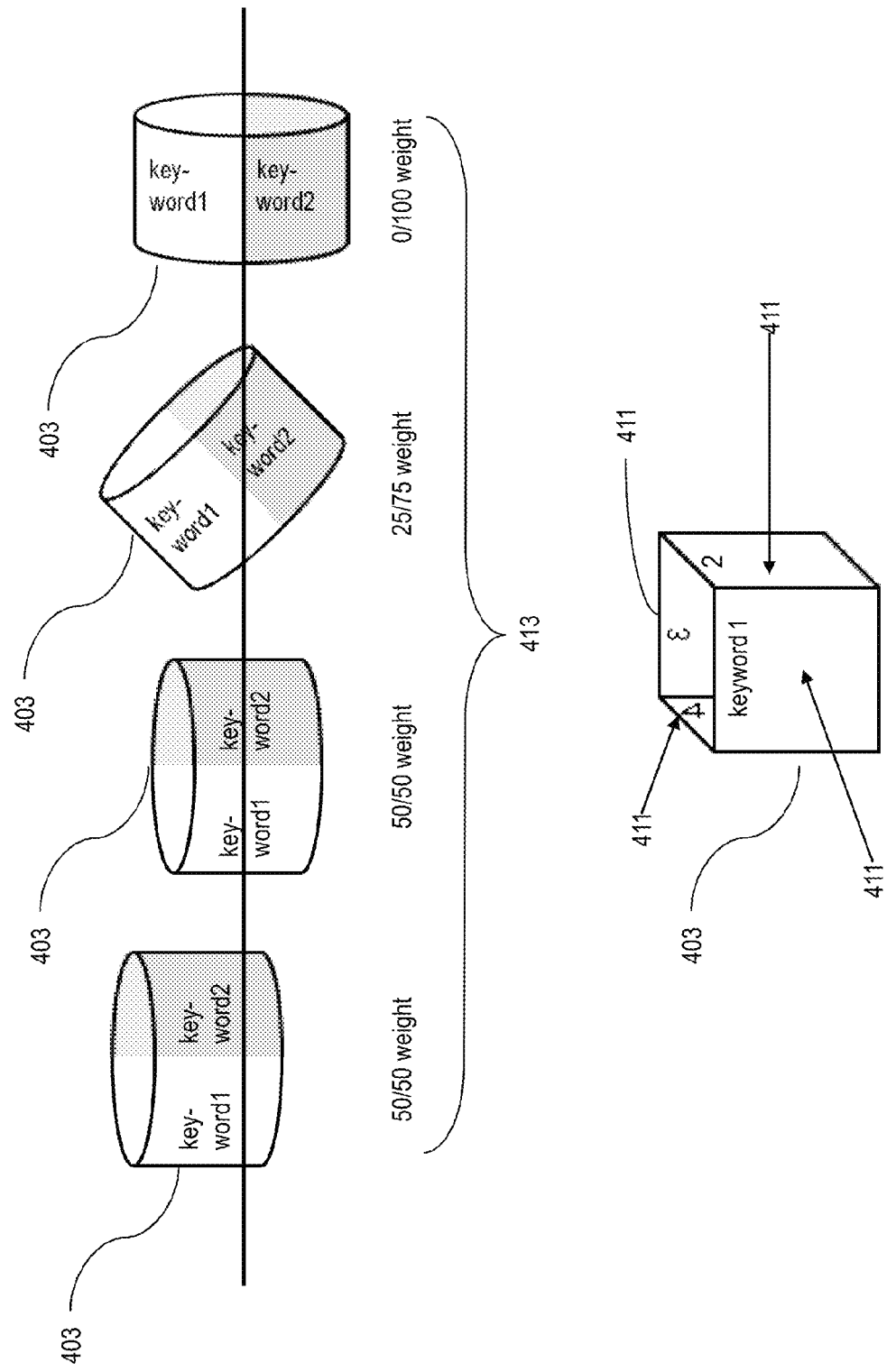

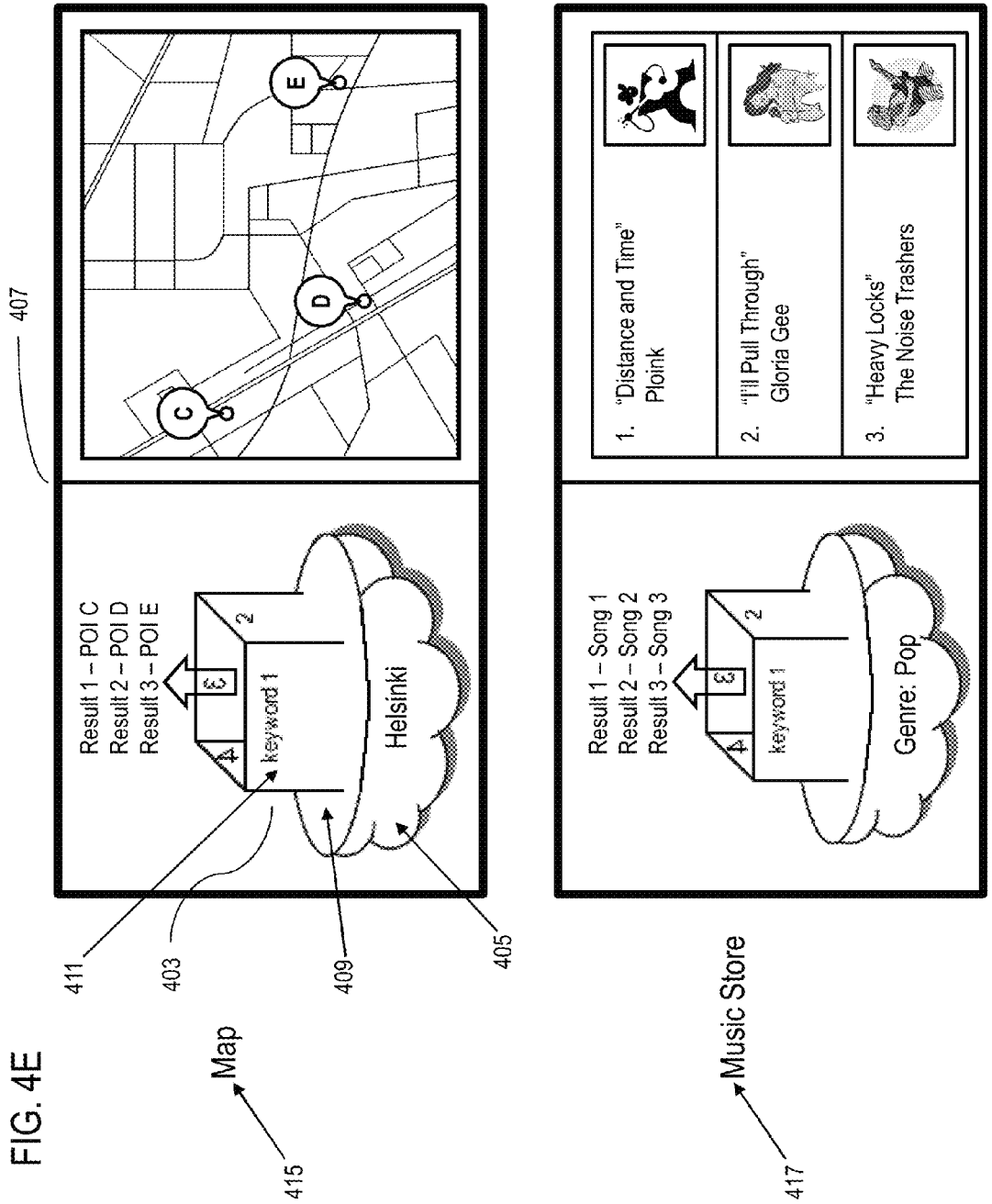

METHOD AND APPARATUS FOR PROVIDING A MULTI-DIMENSIONAL INPUT

BACKGROUND

Service providers and device manufacturers (e.g., wireless, cellular, etc.) are continually challenged to deliver value and convenience to consumers by, for example, providing compelling network services. Often, operability of such network services rely on the user input interaction utilized to access the network services or the devices. User input interaction can be executed via interaction with a user interface. User interaction is limited by the design and configuration of the user interface. Approaches to user interface interaction may prove cumbersome. With the advent of devices and platforms capable of receiving inputs of various means—methods, processes, and approaches are required to support intuitive interaction. However, there still exists a need to have user interaction alternatives that span different user scenarios to allow efficient, intuitive, and enjoyable user interaction enabled by a user interface. As such, device manufacturers and service providers face significant technical challenges to providing efficient, intuitive, and enjoyable multi-parameter discovery and multi-dimensional input.

One area of interest has been the development of alternative approaches to weighted and/or prioritized multi-parameter generation and execution implemented, for example, by a search tool or other executable function/action. Generation and selection of search terms can be tedious for a user. The search experience may tax the ability of the user to conceive unique combinations of search terms. Assigning a weight, or priority or importance to multiple parameters is a powerful tool for finding information or executing an action. However the process of weighting a parameter may be rather static and not entirely intuitive often requiring the discrete steps of keyword definition, keyword weighting, action generation and display. Users may not know what weight to apply to each parameter. Rather, users try out different parameter combinations with randomized weight values resulting in time-consuming search interaction and ill-defined actions and/or results. When conducting an information search, the sheer volume and scope of available information can quickly overwhelm many device users. Such a search limits the productivity of useful search result. However, with the increase in available content and functions accessible to device users, service providers and device manufacturers face significant challenges to present content that is relevant for users by means that are easily and quickly understood. A search experience imparted by various information (e.g., user context, user location, storage metadata, media, etc.) including a mechanism that facilitates a user to enter multiple parameters to form a search sentence and dynamically determine different weights for the parameters focuses a search tailored to a user's specific needs. The relevant approaches to support search functionality may also be applied to all user activities actuated via a user interface. User interface interaction aims to be intuitive and support various application platforms.

SOME EXAMPLE EMBODIMENTS

Therefore, there is a need for an approach for providing a multidimensional input that is dynamically controlled by various intuitive means of user interaction adaptive to ongoing user manipulation processing results in real time.

According to one embodiment, a method comprises causing, at least in part, a mapping of one or more parameters, one or more representations of the one or more parameters, or a combination thereof onto one or more respective surface segments of at least one three-dimensional icon. The method also comprises causing, at least in part, a rendering of the at least one three-dimensional icon in a user interface. The method further comprises determining one or more manipulations of the at least one three-dimensional icon in the user interface. The method further comprises processing and/or facilitating a processing of the one or more manipulations to determine one or more weighting values for the one or more parameters.

According to another embodiment, an apparatus comprises at least one processor, and at least one memory including computer program code for one or more programs, the at least one memory and the computer program code configured to, with the at least one processor, to cause, at least in part, the apparatus to map one or more parameters, one or more representations of the one or more parameters, or a combination thereof onto one or more respective surface segments of at least one three-dimensional icon. The apparatus is also caused to render the at least one three-dimensional icon in a user interface. The apparatus is further caused to determine one or more manipulations of the at least one three-dimensional icon in the user interface. The apparatus is also caused to process and/or facilitate a processing of the one or more manipulations to determine one or more weighting values for the one or more parameters.

According to another embodiment, a computer-readable storage medium carries one or more sequences of one or more instructions which, when executed by one or more processors, cause, at least in part, an apparatus to map one or more parameters, one or more representations of the one or more parameters, or a combination thereof onto one or more respective surface segments of at least one three-dimensional icon. The apparatus is also caused to, at least in part, to render the at least one three-dimensional icon in a user interface. The apparatus is further caused to determine one or more manipulations of the at least one three-dimensional icon in the user interface. The apparatus is also caused to process and/or facilitate a processing of the one or more manipulations to determine one or more weighting values for the one or more parameters.

According to another embodiment, an apparatus comprises means for causing, at least in part, a mapping of one or more parameters, one or more representations of the one or more parameters, or a combination thereof onto one or more respective surface segments of at least one three-dimensional icon. The apparatus also comprises means for causing, at least in part, a rendering of the at least one three-dimensional icon in a user interface. The apparatus further comprises means for determining one or more manipulations of the at least one three-dimensional icon in the user interface. The apparatus also comprises means for processing and/or facilitating a processing of the one or more manipulations to determine one or more weighting values for the one or more parameters.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4E are diagrams of user interfaces utilized in the processes of FIG. 3, according to various embodiments;

DESCRIPTION OF SOME EMBODIMENTS

Examples of a method, apparatus, and computer program for providing a multi-dimensional input are disclosed. As used herein, parameter may include, for example, text or icon based keyword, search term, operator, function, command, executable action, or combination thereof. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term reference object refers to the pool or set of information, controls, settings or a combination thereof selected and/or determined for and/or by a user. The reference object embodies an actionable realm presented in a user interface. For example, a reference object may be visually represented as a cloud icon in a user interface. In this way, the reference object may be the entire Internet, a cloud computing environment such as a company intranet, an information item related to a particular city on a map, a particular music genre in an online music store, or collection of possible actions available to a user equipment or a collection of user devices. In addition, although various embodiments are described with respect to user interface platform, it is contemplated that the approach described herein may be used with other platforms for providing a multi-dimensional input.

Figure 1:
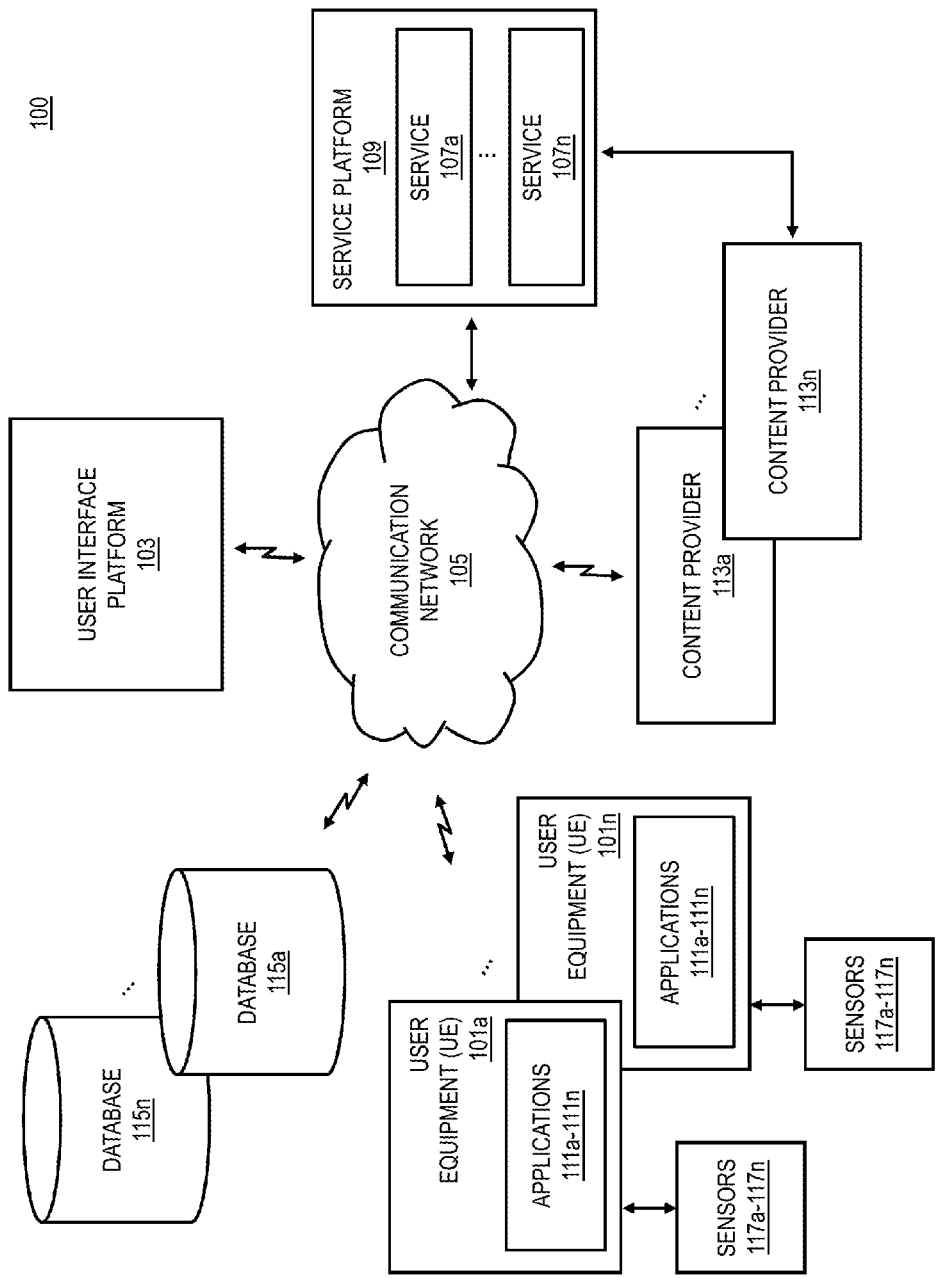
FIG. 1 is a diagram of a system capable of providing a multi-dimensional input, according to one embodiment.

FIG. 1 is a diagram of a system capable of providing a multi-dimensional input, according to one embodiment. As discussed above, user interaction with services and devices is limited by the design and configuration of the user interface. With the advent of devices and platforms capable of receiving inputs of various means—methods, processes, and approaches are required to support intuitive user to user equipment interaction. The user interaction experience may tax the ability of the user to conceive of practical means to access information and employ executable commands. For example, when conducting an information search, the sheer volume and scope of available information can quickly overwhelm many device users. Such limitations adversely affect user interaction. As such, there still exists a need to have user interaction alternatives that span different user scenarios to allow efficient, intuitive, and enjoyable user interaction supported by a user interface. In addition, there still exists a need to facilitate user entry of multiple parameters to form a search string and/or string of executable actions. Further, there still exists a need to facilitate user attempts to dynamically assign different weights for the executed parameters to enable the user to quickly obtain different focused results and/or actions to improve and enhance user results in real time.

To address this problem, a system 100 of FIG. 1 introduces the capability to enrich and enhance user input interaction on user equipment by providing a multi-dimensional input to be performed based on intuitive presentation of multiple parameters mapped on a 3D object represented as a dynamically controlled 3D icon in a user interface. The system 100 also provides a framework for presenting and rendering multiple parameters that are operable to execute a function. The system 100 also introduces a user interface to provide a more fluid and a reduced user intensive interaction experience to enable efficient and weighted (i.e. prioritized) multi-parameter discovery and input.

As shown in FIG. 1, the system 100 comprises a user equipment (UE) 101a-101n (collectively referred to as UE 101) having connectivity to a user interface platform 103 (discussed in detail below) via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In certain embodiments, one or more parameters (e.g., keywords, terms, executable commands, etc.) are selected, determined, and/or provided with and/or without Boolean operators to form a search and/or command string. The one or more parameters are mapped on a surface segment of a 3D object. The surface segment is representative of one facet (i.e., side, face, portion, etc. . . . ) of a 3D object. The user selects, determines and/or is provided with a reference object. The reference object represents the set of information, collection of available controls, collection of available settings, or a combination thereof to which the search and/or executable command string is to be directed. The 3D object is dynamically controlled by user interaction within and/or in relation to the reference object to define the orientation information of the 3D object about the reference object. The 3D object, reference object, orientation information, and system manipulation define a dynamically controlled user interface. System manipulation may be actuated by any means that the UE 101 is capable. A system application determines the current orientation of the 3D object in relation to the reference object. The system application calculates the percentage of each surface side that is submerged, covered, and/or within the reference object. This percent coverage defines the weight assigned to each parameter in the search and/or command string. The system application processes the search and/or command string wherein each of the one or more parameters has been assigned a weight to define an executable action. The resultant action is presented about a user interface. The system may be responsive to real time user manipulation(s) functioning in multiple continual iterations, wherein each manipulative event may determine a unique resultant action, each action being displayed on a user interface in sequence. The resultant action of the user input interaction is displayed, for example, on the manipulated user input UE 101 itself, or on a third party UE 101, and/or communicated to a service platform, and/or content provider, and/or database, or a combination thereof. In addition, the user interface may be presented on a plurality of devices. Manipulations on any of the devices presenting the user interface may control the functionality of any or all of the respective devices.

In certain embodiments, a user interaction multi-dimensional input interface functions as an integrated interface tool to perform at least the distinct functions of parameter definition, user input platform, and processing platform. The user interaction input interface is integrated via network communication such that each of the distinct functions are localized in the native UE, communicated via the network or networks to third party User Equipment(s), or a combination of native UE 101 and third party User Equipment(s), database(s), content provider(s), and service platform(s). In certain embodiments, a user interaction multi-dimensional input interface functions as part of a parameter selection interface enabling efficient multi-dimensional multi-parameter discovery and input.

In certain embodiments, a user interaction input interface functions in part with and/or as a parameter presentation and/or parameter generation and/or parameter determination platform. In certain embodiments, parameters are selected and/or entered by a user or users. In certain embodiments, parameters are derived and/or generated from stored information acquired from any available data accessible by the communication network(s). For example, parameters are derived from storage and/or applications native to or accessible from User Equipment(s), content provider(s), service platform(s), and storage database(s) accessible by a user, or a combination thereof. The storage database, for example, includes media with associated meta-data. The associated meta-data or alternative forms of information is presented as parameters or provide the thematic foundation or context by which parameters are presented. In certain embodiments, parameters are defined by network-associated applications and services to determine parameters to be mapped to the surface segments of a 3D object icon.

For example, the information associated with stored and/or accessible data is processed to provide users with useful intuitive parameters. For example, accessible data is processed to derive practical themes for suggested parameters. Users may focus the parameters presented to suit a specific scenario by selection, or the process of selection is automated to encourage ease of use or useful suggestion constructs. Further, in some embodiments, parameters are presented for selection and/or display according to thematic and/or hierarchical lists. Themes are presented, suggested, and or entered to accord with user requirements. For example, themes are based on user context, location, prior use, modalities (e.g., productivity, lifestyle, entertainment, travel, games, educational, etc.), and/or third party suggestions communicated via the network. Further, in some embodiments, parameters are purely random or merely randomized in order to provide an alternative to user generated and/or selected parameters. All such parameters provided to be assigned weights to enhance a user interaction experience.

In certain embodiments, a user interaction input interface supports, enables and/or is an integrated component of a search function and/or search platform. The user manipulates the interface by dynamically controlling the three-dimensional orientation of the 3D search object icon. The user may perform such control of the 3D search object by tilting the UE 101 within six degrees of freedom. The UE 101 may employ location sensors, orientation sensors, movement sensors, gyroscope-type sensors, or any combination thereof, or similar-type sensors to process the orientation information of the 3D object as manipulated and controlled by a user. In certain embodiments the user controls dynamically the three-dimensional orientation of the 3D search object icon at the user interface with any available X/Y/Z controller mechanism or through user interaction with a touch screen. In certain embodiments the user controls dynamically the three-dimensional orientation of the 3D search object icon by a combination of UE 101 motion sensing, peripheral device controller, and touch screen. In certain embodiments, parameters selected and/or employed for search may be treated as a Boolean search utilizing any selected or determined Boolean operators.

In certain embodiments, a user interaction input interface supports executable system actions, commands, operators, functions, controls, settings or a combination thereof. The user manipulates the interface by entering inputs using the interaction interface to initiate an executable system action, actionable at any of the system components. In certain embodiments the user controls dynamically the three-dimensional orientation of the 3D object icon by any combination of UE 101 motion sensing, peripheral device controller, and touch screen interaction to execute a system action.

In certain embodiments, the system application interface determines the current orientation of the 3D object icon in relation to the reference object. The system application calculates how many percent of each surface segment defining one or more parameters of the 3D object icon is within the reference object. This defines the weight of each parameter to be processed and/or executed by system action. For example, the system may assume that the combined weight of all parameters in an executable action string determined by a user is always 100%. There are four parameters in the executed action string. Thus, in one extreme case, the max weight of one parameter may be 100% when the weight of the other three parameters is 0%. The other extreme is that the weight is an equal 25% between all parameters. In this particular example a "four parameter" executable action string may employ a 3D object icon having four surface segments wherein each one of the four parameters are mapped to a surface segment or side of the 3D object—each surface segment being associated with at least one parameter. The assigned parameter weight is spectrally scaled and controlled by user manipulation of the interface input.

By way of example, the UE 101*a-n*, the user interface platform 103, the content provider 113*a-n*, the service platform 109, and the database (115*a-n*) communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
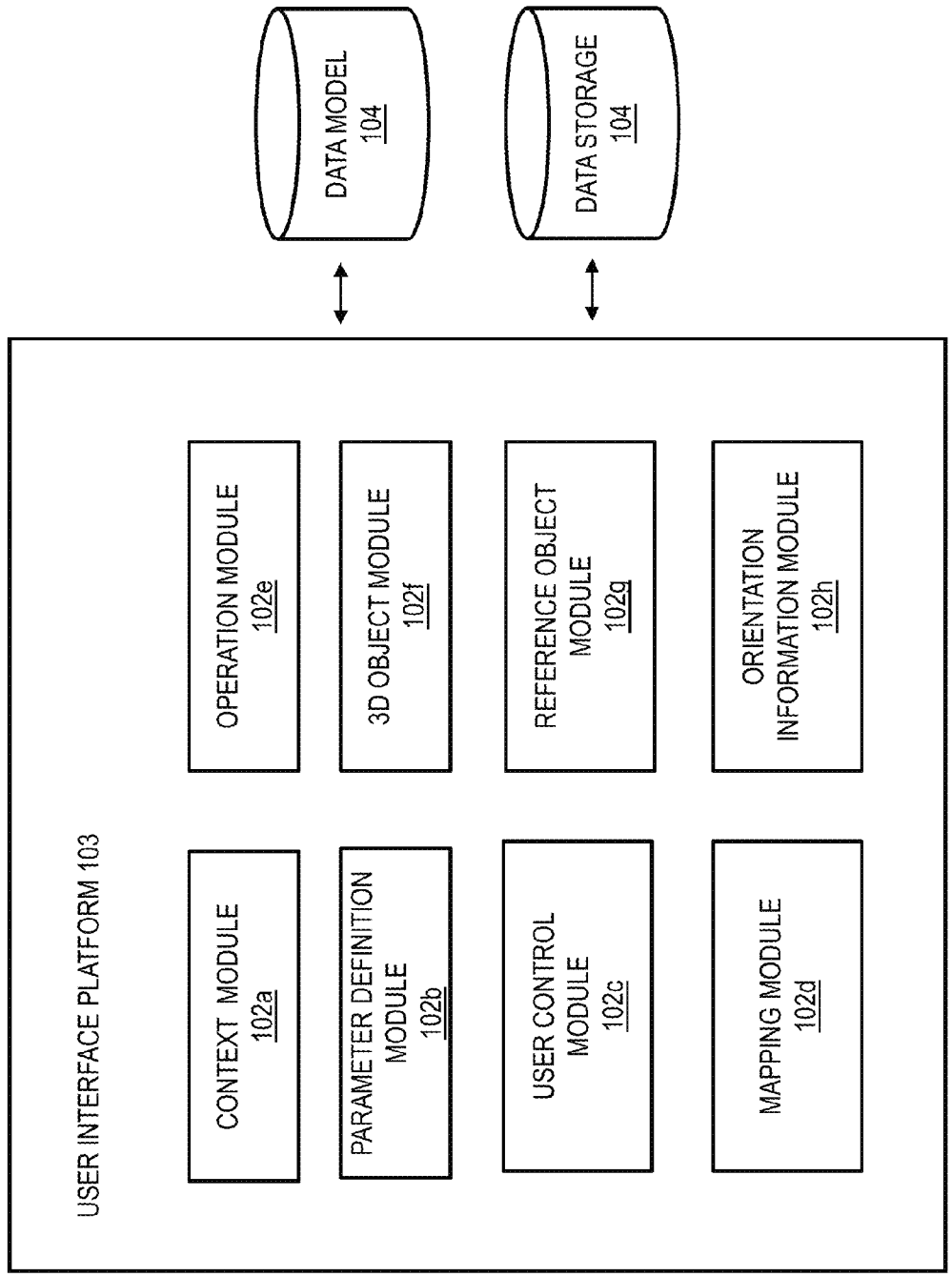
FIG. 2 is a diagram of the components of a user interface platform for providing a multi-dimensional input, according to one embodiment.

FIG. 2 is a diagram of the components of user interface platform 103, according to one embodiment. By way of example, the user interface platform 103 includes one or more components for providing a multi-dimensional input. It is contemplated that the functions of these components may be combined in one or more components or performed by other components of equivalent functionality. For example, the functions of these components may be embodied in one or more applications 111 executed on a UE 101. Alternatively, the functions of these components can be embodied in one or more modules of the UE 101, or one or more services 107 on the service platform 109.

The context module 102*a* determines the context associated with a user of a UE 101 and/or an alternative UE 101 or a plurality of devices accessible via the communication network 105. The context may comprise, for example, the current location of the user, a future location of the user based on one or more mapping applications 111 running on the UE 101, a current or future appointment based on one or more calendar applications 111 running on the UE 101, etc. The context module 203 can determine the context from, for example, one or more applications 111 running on the UE 101, one or more modules of the UE 101, one or more sensors 117 associated with the UE 101, one or more services 107 associated with the UE 101, or any combination thereof. The context module 102*a* can also determine the context associated with the users and/or the UE 101 based on interaction information at a user interface of the UE 101. For example, the UE 101 may include user interfaces that allow the users of the UE 101 to enter context regarding the users and/or the UE 101.

In one embodiment, the context module 102*a* continuously, periodically, or a combination thereof, determines the context information of the user and/or the UE 101 before and after a user interface interaction.

The parameter definition module 102*b* allows multiple parameters (e.g., keywords, terms, executable commands, etc.) to be rendered about a user interface on UE 101. Parameters may be defined by many different constructs. Parameters, for example, may be entered by the user or selected by the user, for example, from hierarchical lists and/or drop down menus. For example, user entered parameters are achieved by such means as a user typing, speaking, motioning, and by alternative communication means, or a combination thereof. For example, user selected parameters are achieved by such means as a user selecting a higher-level parameter to define lower-order parameters (e.g. "Pantherinae" that includes a set of more detailed parameters like "Tiger", "Lion", "Jaguar", "Leopard", each of which is assigned to one of numerous loci about at least one categorical dimension to define a user interface).

Further, in certain embodiments, parameters may also be selected from graphical displays such as maps (especially when geographic locations and points of interest (POIs) are relevant) or even from media items like photos or music. Graphical displays and media may be stored locally on the native device or generated/derived from any network accessible UE, content provider, database, service platform, or a combination thereof. Parameters derived from such stored data may be generated from any data-associated information, for example, photo titles/categories, photo-associated metadata such as geo-tags, song content lyrics, or a combination thereof. Further, in certain embodiments, parameter definition is influenced by user context, as discussed above.

The user control module 102c, functions in determining the assigned parameter weight. An actionable response may be the related result of any user interaction with UE. A user may physically interact with a UE, for example, by manipulating the user interface rendered on UE. The UE 101 may employ location sensors, orientation sensors, movement sensors, gyroscope-type sensors, or any combination thereof, or similar-type sensors to process the orientation information of the 3D object as manipulated and controlled by a user. In certain embodiments the user controls dynamically the three-dimensional orientation of the 3D search object icon at the user interface with any available X/Y/Z controller mechanism or through user interaction with a touch screen. In certain embodiments the user controls dynamically the three-dimensional orientation of the 3D search object icon by a combination UE 101 motion sensing, peripheral device controller, and touch screen. Interaction initiation manipulation includes, but is not limited to, for example, touch and/or multi-touch.

The operation module 102e, renders an action in response to user control. A response action may be caused, at least in part, by an interaction with a user interface. The response action may occur at the native device rendering the user interface receiving a user interaction, at any component of the user interface platform 103, at UE 101 *a-n*, at database 115*a-n*, at content provider 113*a-n*, at service platform 109 *a-n*, at any communication receivable attribute connected via communication network 105, or any combination thereof.

By way of example, a response action is the resulting action wherein a user interaction is either a proximal (i.e., direct) or distal (i.e., indirect) cause. In certain embodiments, a response action may include, for example, a search for information stored locally or stored network accessibly, an actionable command (e.g. application launch and/or action, function control, etc.), a control or setting command (e.g., a user choosing an available UE 101 setting, etc.), a communication via a network, or a combination thereof.

Figure 3A:
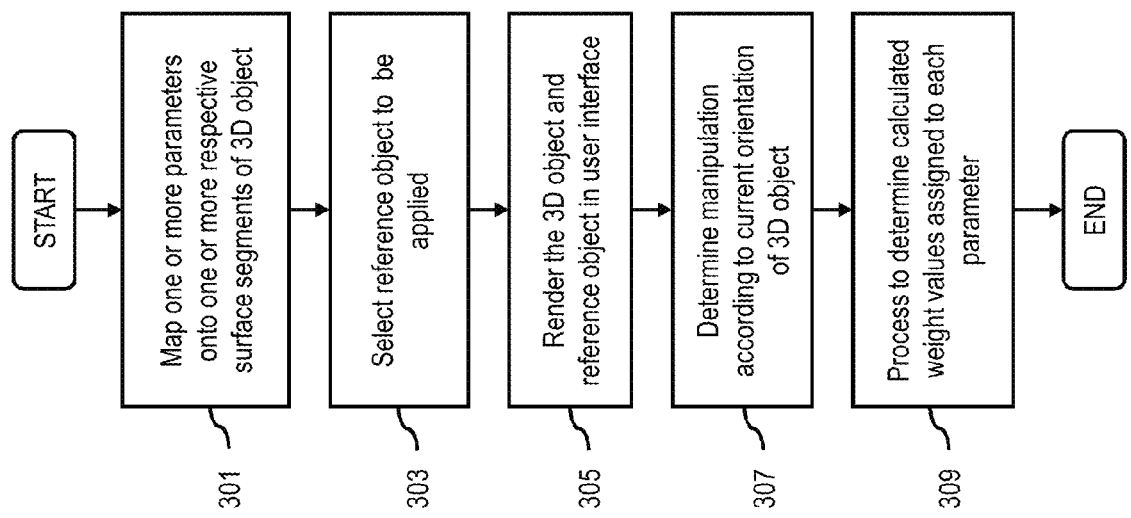
FIG. 3A is a flowchart of a process for providing a multi-dimensional input, according to one embodiment.
Figure 6:
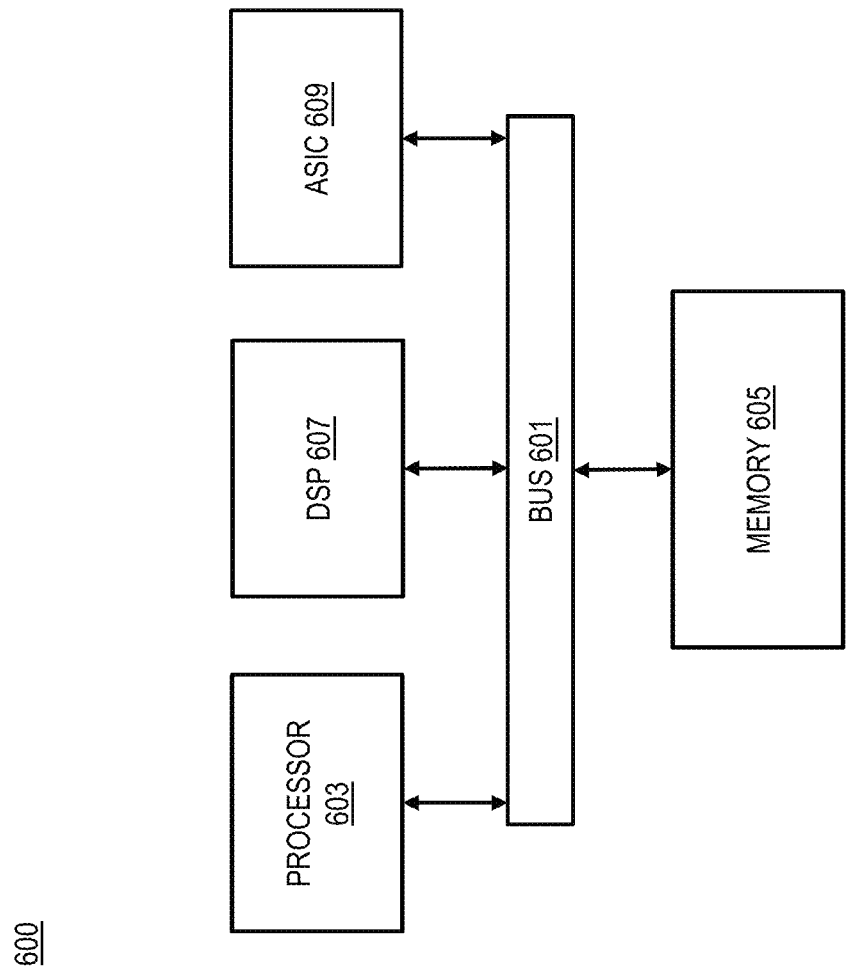
FIG. 6 is a diagram of a chip set that can be used to implement an embodiment of the invention.

FIG. 3A is a flowchart of a process for providing a multi-dimensional input, according to one embodiment. In one embodiment, the user interface platform 103 performs the process 300 and is implemented in, for instance, a chip set including a processor and a memory as shown in FIG. 6.

In step 301, one or more parameters are mapped onto one or more respective segments of a 3D object. By way of example, in one use case where the one or more parameters are keywords related to one or more characteristics of an area of user interest, such as a general search query, parameters are generated by a user. In one embodiment, the user interface platform 103 determines the one or more parameters. In other embodiments, the user interface platform 103 can dynamically generate a set of keywords. For example, the platform 103 can perform a semantic analysis of user search histories, documents, metadata, preferences, activities, service databases, etc. to determine appropriate keywords. In other embodiments a user generates multiple keywords by entering parameters into a search query. A 3D object is determined according to the number of keyword parameters entered by a user.

In step 303, a user selects the reference object to be applied. In one embodiment, the user selects a set of information to which the search is directed. The reference or set of information may be visually represented as a cloud icon in the search engine interface. The set or reference object may be the entire Internet, a cloud computing environment such as a company intranet, a particular city on a map, a particular music genre in an online music store. In step 305, the 3D object and reference object are rendered in the user interface. In one embodiment, the user interface platform 103 causes, at least in part, a rendering of the one or more representations in the user interface as at least one 3D object icon having parameter mapped surface segments and a reference object represented as a cloud icon. For example, the various surface segments of the 3D object is partially "submersed" or partially covered by the reference object "cloud".

In step 307, a manipulation is determined according to current orientation of 3D object. By way of example, system manipulation may be actuated by any means that the UE 101 is capable. A user may physically interact with a UE, for example, by manipulating the user interface rendered on UE. The UE 101 may employ location sensors, orientation sensors, movement sensors, gyroscope-type sensors, or any combination thereof, or similar-type sensors to process the orientation information of the 3D object as manipulated and controlled by a user. In certain embodiments the user controls dynamically the three-dimensional orientation of the 3D search object icon at the user interface with any available X/Y/Z controller mechanism or through user interaction with a touch screen. In certain embodiments the user controls dynamically the three-dimensional orientation of the 3D search object icon by a combination UE 101 motion sensing, peripheral device controller, and touch screen. In one embodiment, the user interface platform 103 determines to present the user interface on a multi-touch enabled device. In this case, the one or more manipulations comprise, at least in part, interaction information with one or more points on the multi-touch enabled device. In another embodiment, the user interface platform 103 can cause, at least in part, a presentation of the user interface on a plurality of devices. In this case, the one or more manipulations are determined with respect to the plurality of devices. In other words, manipulations or interactions at two different devices can be used to interact and select parameters. The devices can then be operated by separate users whose combined manipulations or interactions can be captured for processing.

In step 309, orientation information is processed to determine calculated weight values assigned to each parameter. A system application determines the current orientation of the 3D object in relation to the reference object. The system application calculates the percentage of each surface side that is submerged, covered, and/or within the reference object. This percent coverage defines the weight assigned to each parameter in the search and/or command string. The system application processes the search and/or command string wherein each of the one or more parameters has been assigned a weight to define an executable action. The resultant action is presented about a user interface. The user interface platform 103 can then determine one or more rendering characteristics of the user interface, the one or more representations, or a combination thereof the one or more based, at least in part, on the weighted parameter operation.

Figure 3B:
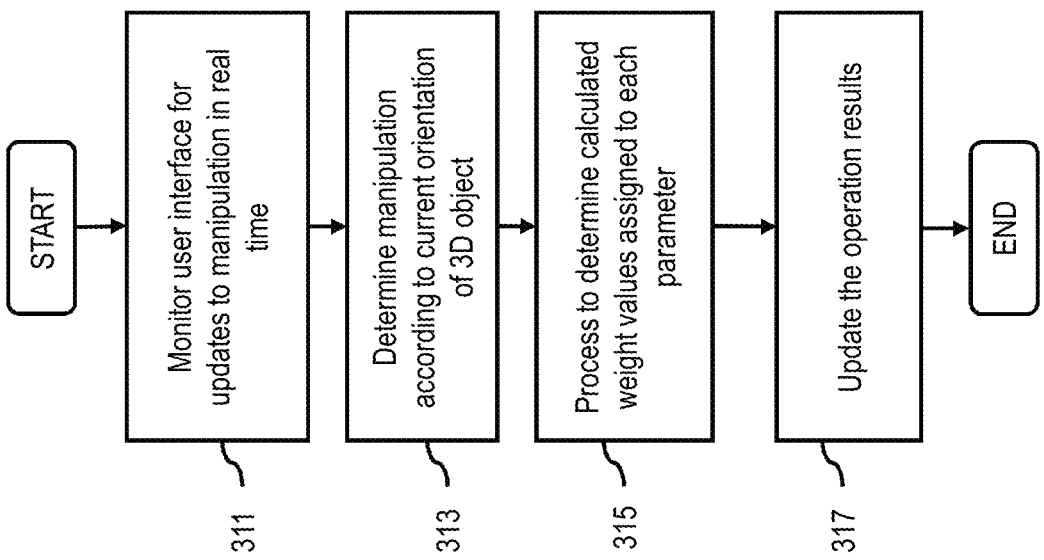
FIG. 3B is a flowchart of a process for providing a multi-dimensional input, according to one embodiment operable to monitor user interface for updates.

In one embodiment, the user interface platform 103 can cause, at least in part, an initiation of at least one action, at least one function, a user initiated setting or control, or a combination thereof based, at least in part, on the weighted parameters FIG. 3B is a flowchart of a process for providing a multi-dimensional input based on an updated iterative manipulation, according to one embodiment. In one embodiment, the user interface platform 103 performs the process 310 and is implemented in, for instance, a chip set including a processor and a memory as shown in FIG. 6. In one embodiment, the process 310 describes a process for dynamically providing a multi-dimensional input for presentation in a user interface as described the various embodiments discussed herein.

As described above in the process 300 of FIG. 3A, the user interface platform 103 can present one or more user interfaces for multi-dimensional input on a plurality of devices that can work either independently or cooperatively to determine parameters. Accordingly, in step 311, the user interface platform 103 can monitor the user interface for updates to manipulation in real time. As noted, the system may be responsive to real time user manipulation(s) functioning in multiple continual iterations, wherein each manipulative event may determine a unique resultant action, each action being displayed on a user interface in sequence. The resultant action of the user input interaction is displayed, for example, on the manipulated user input UE 101 itself, or on a third party UE, and/or communicated to a service platform, and/or content provider, and/or database, or a combination thereof. By way of example, this monitoring can be made via peer-to-peer signaling (e.g., via short-range wireless radio such as Bluetooth, WiFi, etc.) or via a client-server interaction with a backend system. In some embodiments, the user interface platform 103 can determine context information associated with the one or more devices presenting user interface. In one embodiment, context information may include search history, location, time, activity, and the like associated with the devices.

Next in step 313, the user interface platform 103 determines changes in the one or more manipulations, the orientation of the 3D object, etc. (as described in step 307 of FIG. 3A). For example, the changes may be the result of additional interactions with the UI as detected by sensors, touch screens, etc. associated with the UE 101. The changes or additional manipulations are then processed to determine new or updated weighting values (step 315). By way of example, the updated values are generated using the process as described with respect to step 309 of FIG. 3A.

The user interface platform 103 then processes and/or facilitates the update of operation results (step 317) as a function of the real time monitoring. For example, after an initial UE 101 manipulation resulting in a user interface operation a user may choose to alter the weighting of the parameters and conduct a subsequent operation. In certain embodiments, operation results are displayed to allow and encourage a user to fine-tune the operation results. Such fine-tuning requires iterative updating of the 3D icon's orientation information in relation to the reference object.

Figure 4B:
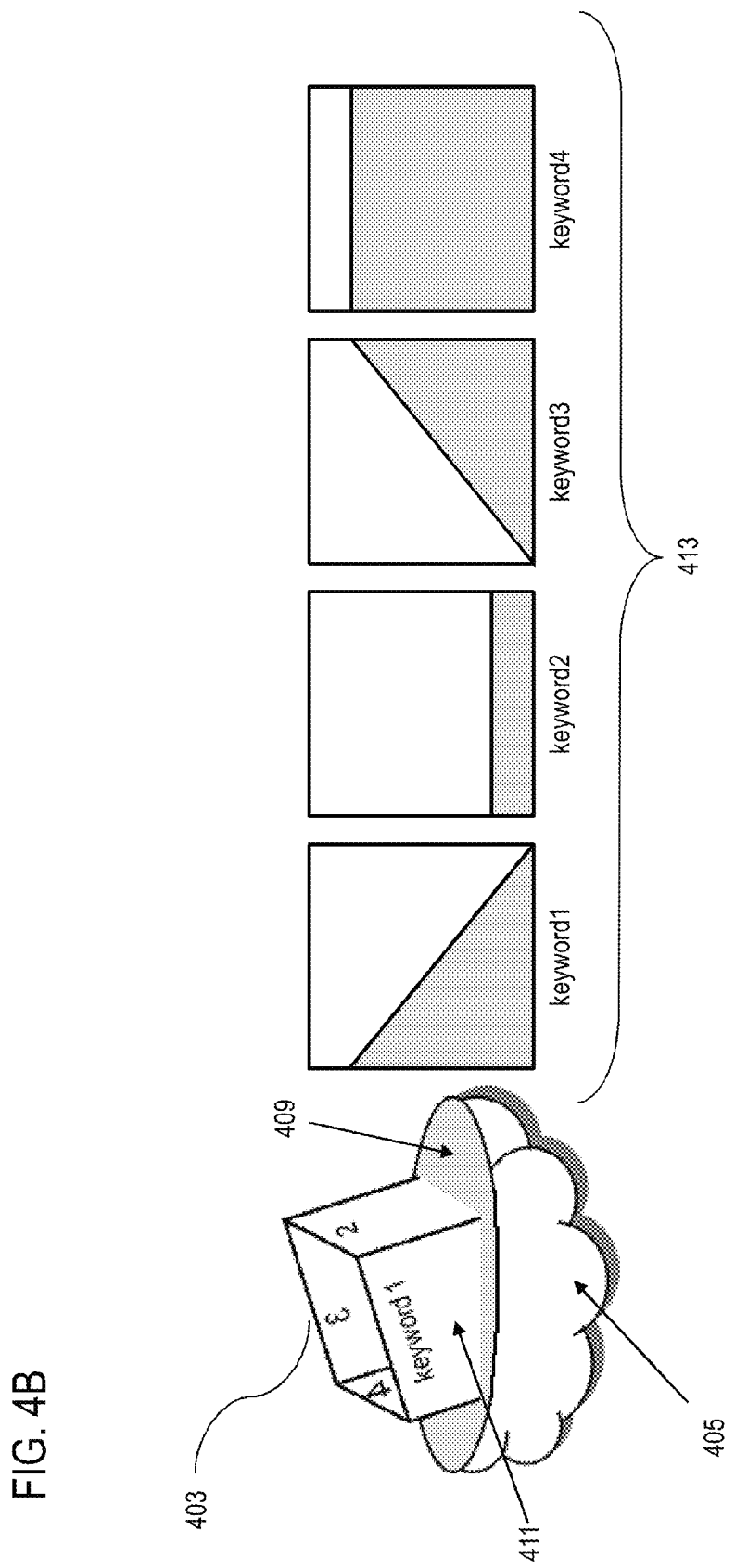

FIGS. 4A-4E are diagrams of multi-dimensional search object user interfaces utilized in the processes of FIG. 3, according to various embodiments. FIG. 4A illustrates a user interface 407 of a device (e.g., a UE 101) based on an initial setup of an application 111a interfacing with the user interface platform 103. As discussed above, the user enters a string of search keyword parameters (for example, keywords 1-4) in a search field 401. The search engine interface assigns each keyword to a surface segment 411 or side of a four-sided 3D object 403 (not a 6-sided cube). This "3D search icon" 403 is shown on the device screen as user interface 407. The user may rotate the cube by manipulating the device to view the keywords on the different sides, or all four keywords may be shown simultaneously. The device manipulation actuates orientation information 409 defined by the relation of the 3D search object 403 to the reference object 405 or information set. In the illustrated example, the user directs the search to the entire Internet, which is shown in the interface as a cloud icon representing reference object 405. By default, the sides of the "3D search icon" 403 are evenly within the cloud 405. Thus, the weight of each of the four keywords is 25%. The results of this search 408 may be animated as "floating up from the cloud". Although not illustrated, there may be a controller for the user to dynamically alter the speed of appearance of the animated search results. The user re-orientates the "3D search icon" for example by re-orientating the mobile device on three axes or by directly manipulating the "3D search icon" on a touch screen. The weight of the keywords changes and new search results 410 are shown. In the illustrated example at FIG. 4A, keywords 4 and 1 are increased in weight as they are increasingly more submerged within the search cloud; keyword 2 gets less weight as it is less submerged and projecting above the limits of the search cloud. The proportion of surface segment 411 submersion according to the portion of each side currently "within" the cloud icon defines the weight of each keyword.

FIG. 4B illustrates an example of calculating the weight of multiple parameters mapped to the surface segments of a 3D object icon based on an initial setup of an application 111a interfacing with the user interface platform 103. In certain embodiments, the number of parameter keywords determines the number of surface segments 411 and thus the number of sides and configuration of the 3D search object icon 403. The weight assigned to each keyword parameter is determined according to percents according to the percent portion of each surface segment covered within the reference object 405 cloud. For example, as illustrated in FIG. 4B, surface segment 1 having keyword 1 mapped accords to 40% "coverage". Surface segment 2 has 10% coverage. Surface segment 3 has 40% coverage. Surface segment 4 has 90% coverage. In order to determine the weight of each keyword parameter the sum of each surface segment's "coverage" is calculated. The coverage of each side is divided by the calculated sum of total coverage. In the illustrated example, the total "coverage" is 40+10+40+90=180. The calculation for surface segment 1 is: 40/180=22.2% weight for keyword 1. The calculation for surface segment 2 is: 10/180=5.6% weight for keyword 2. The calculation for surface segment 3 is: 40/180=22.2% weight for keyword 3. The calculation for surface segment 4 is: 90/180=50% weight for keyword 4. In practice, these weight values may be rounded up by the system interface. In certain embodiments, the weight of parameters is defined by the percent of each surface segment submerged 413 or inside of the reference object 405 cloud. This percent of each surface segment within the cloud 413 is defined by the orientation information 409 according to the orientation of the 3D object 403 in relation to the reference object 405.

FIG. 4C illustrates how the number of parameters defines the configuration of the 3D object icon 403 of a UE 101 based on an initial setup of an application 111*a* interfacing with the user interface platform 103. FIG. 4C illustrates a cylinder 3D object icon 403 according to a two parameter keyword operation string. For example, the cylinder only includes the two cylindrical surface segments having mapped parameters and does not include a top or base surface segment. As discussed herein, the weight of parameters is defined by the percent of each surface segment submerged 413 or inside of the reference object 405 cloud. This percent of each surface segment within the cloud 413 is defined by the orientation information 409 according to the orientation of the 3D object 403 in relation to the reference object 405. For example, a "triangle" having three surface segments (not including the base of a pyramid-type object) is utilized for three keyword parameters. Further, a "cube" having four surface segments (not including the top and base of the object) is utilized for four keyword parameters. Various objects may be realized to accommodate varying number of parameters consistent with the provided examples.

Figure 4D:
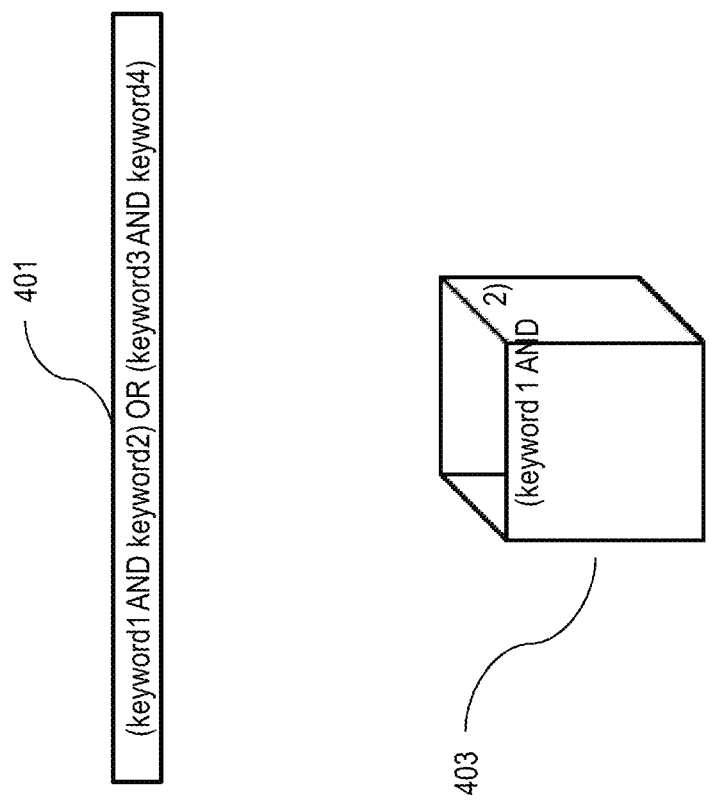

FIG. 4D illustrates a search string utilizing Boolean operators based on an initial setup of an application 111*a* interfacing with the user interface platform 103. As discussed above, the user enters a string of search keyword parameters (for example, keywords 1-4) in a search field 401 combined in a search string with Boolean operators. The search engine interface assigns each keyword to a surface segment 411 or side of a four-sided 3D object 403 (not a 6-sided cube). As illustrated, the Boolean operator "AND" combines keywords 1 and 2 by associating surface segments 1 and 2 of the 3D object. As such, keywords 1 and 2 may be weighted together as unified Boolean term in a query. As in previous embodiments, the user may rotate the cube by manipulating the device to view the keywords on the different sides, or all four keywords may be shown simultaneously. The device manipulation actuates orientation information 409 defined by the relation of the 3D search object 403 to the reference object 405 or information set. In the illustrated example, the user directs the search to the entire Internet, which is shown in the interface as a cloud icon representing reference object 405. By default, the sides of the "3D search icon" 403 are evenly within the cloud 405. Thus, the weight of each of the four keywords is 25%. The results of this search may be animated as "floating up from the cloud". FIG. 4D does not depict keywords 3 and 4, however they are included in the search string and associated query in a Boolean operated search.

FIG. 4E illustrates a user interface of a UE 101 based on an initial setup of an application 111*a* interfacing with the user interface platform 103. In certain embodiments, the user interface may embody a split-screen with information from the reference object the search and/or operation is directed to. For example, points of interest (POIs) on a map may define the provided parameters. The reference object may be limited to a set of information such as information related to a regional location or city like Helsinki as depicted. The search engine interface assigns each keyword to a surface segment 411 or side of a four-sided 3D object 403 (not a 6-sided cube). This "3D search icon" 403 is shown on the device screen as a split-screen user interface 407. The user may rotate the cube by manipulating the device to view the keywords on the different sides, or all four keywords may be shown simultaneously. The device manipulation actuates orientation information 409 defined by the relation of the 3D search object 403 to the reference object 405 or information set. In the illustrated example, the user directs the search to a map 415 and the set of information inclusive of and related to Helsinki, which is shown in the interface as a cloud icon representing reference object 405. By default, the sides of the "3D search icon" 403 are evenly within the cloud 405. Thus, the weight of each of the four keywords is 25%. The results of this search may be animated as "floating up from the cloud". The user re-orientates the "3D search icon" for example by re-orientating the mobile device on the three axes. The weight of the keywords changes and new search results are shown. The proportion of surface segment 411 submersion of how much of each side is currently "within" the cloud icon defines the weight of each side and keyword. In certain embodiments including an interface to a music store 417, parameters are defined by musical genre information limited to, for example, information and links provided in an online music store. Although not illustrated, interfaces to other special information databases and online stores may also be provided.

The processes described herein for providing a multi-dimensional input may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
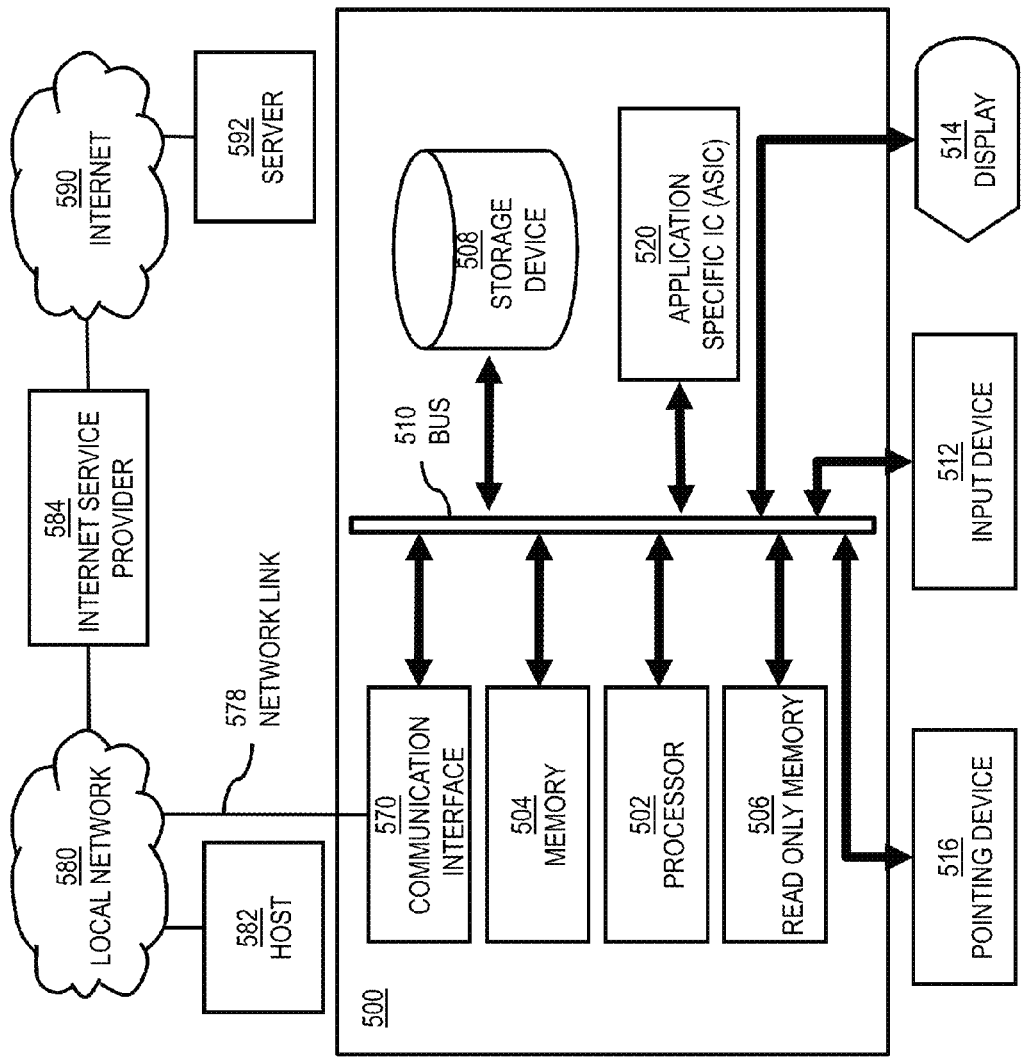
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide a multi-dimensional input, as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing a multi-dimensional input.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing a multi-dimensional input. The computer program code is a set of instructions or statements providing instructions for the operation of the processor and/ or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing a multi-dimensional input. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing a multi-dimensional input is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing a multi-dimensional input to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide a multi-dimensional input as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing a multi-dimensional input.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide a multi-dimensional input. The memory 605 also stores the data associated with or generated by the execution of the inventive steps.

Figure 7:
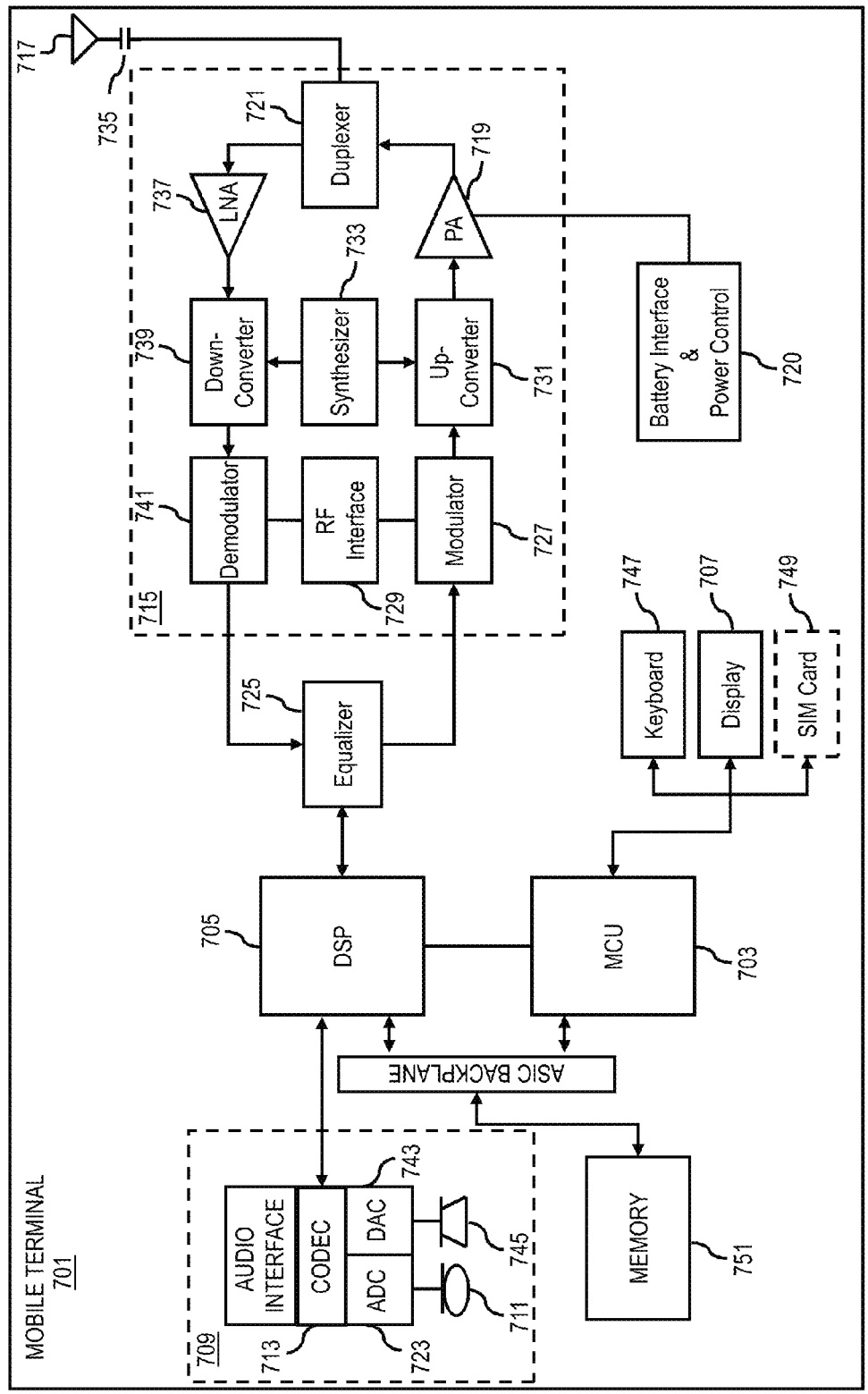
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing a multi-dimensional input. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing a multi-dimensional input. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide a multi-dimensional input. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a mapping of one or more parameters, one or more representations of the one or more parameters, or a combination thereof onto one or more respective surface segments of at least one three-dimensional icon;
   a rendering of the at least one three-dimensional icon in a user interface;
   one or more manipulations of a position of the at least one three-dimensional icon in the user interface with respect to one or more reference objects rendered in the user interface; and
   a processing of the one or more manipulations to determine one or more weighting values for the one or more parameters,
   wherein the one or more weighting values are based, at least in part, on the percentage of each of the one or more respective surface segments that is submerged in the one or more reference objects, covered by the one or more reference objects, within the one or more reference objects, or a combination thereof, and
   wherein the one or more reference objects represent, at least in part, one or more sets of information, one or more controls, one or more settings, or a combination thereof to which the one or more parameters apply.

2. A method of claim 1, wherein the (1) data and/or (2) information and/or (3) at least one signal are further based, at least in part, on the following:
   a processing of the one or more manipulations to determine orientation information of the at least one three-dimensional object;
   wherein the one or more weighting values are determined based, at least in part, on the orientation information.

3. A method of claim 1, wherein the (1) data and/or (2) information and/or (3) at least one signal are further based, at least in part, on the following:
   processing and/or facilitating a processing of the one or more parameters to determine one or more results of at least one operation based, at least in part, on the one or more weighting values.

4. A method of claim 3, wherein the (1) data and/or (2) information and/or (3) at least one signal are further based, at least in part, on the following:
   a rendering of one or more other representations of the one or more results in the user interface.

5. A method of claim 4, wherein the (1) data and/or (2) information and/or (3) at least one signal are further based, at least in part, on the following:
   a monitoring of the user interface for one or more updates to the one or more manipulations, one or more other manipulations, or a combination thereof in at least substantially real time; and
   at least one determination to update the one or more results, the rendering of the one or more other representations of the one or more results, or a combination thereof based, at least in part, on the monitoring.

6. A method of claim 3, wherein the at least one operation includes, at least in part, a query.

7. A method of claim 1, wherein the (1) data and/or (2) information and/or (3) at least one signal are further based, at least in part, on the following:
   at least one determination of one or more Boolean operators for the one or more parameters; and
   at least one determination of the mapping, the one or more weighting values, or a combination thereof based, at least in part, on the one or more Boolean operators.

8. A method of claim 1, wherein the (1) data and/or (2) information and/or (3) at least one signal are further based, at least in part, on the following:
   at least one determination of the one or more manipulations based, at least in part, on one or more location sensors, one or more orientation sensors, one or more movements sensors, or a combination thereof of at least one device associated with the user interface.

9. An apparatus comprising:
   at least one processor; and
   at least one memory including computer program code for one or more programs,
   the at least one memory and the computer program code configured to, with the at least one processor, cause the apparatus to perform at least the following,
      cause, at least in part, a mapping of one or more parameters, one or more representations of the one or more parameters, or a combination thereof onto one or more respective surface segments of at least one three-dimensional icon;
      cause, at least in part, a rendering of the at least one three-dimensional icon in a user interface;
      determine one or more manipulations of a position of the at least one three-dimensional icon in the user interface with respect to one or more reference objects rendered in the user interface; and
      process and/or facilitate a processing of the one or more manipulations to determine one or more weighting values for the one or more parameters, wherein the one or more weighting values are based, at least in part, on the percentage of each of the one or more respective surface segments that is submerged in the one or more reference objects, covered by the one or more reference objects, within the one or more reference objects, or a combination thereof, and wherein the one or more reference objects represent, at least in part, one or more sets of information, one or more controls, one or more settings, or a combination thereof to which the one or more parameters apply.

10. An apparatus of claim 9, wherein the apparatus is further caused to:

process and/or facilitate a processing of the one or more manipulations to determine orientation information of the at least one three-dimensional object;

wherein the one or more weighting values are determined based, at least in part, on the orientation information.

11. An apparatus of claim 9, wherein the apparatus is further caused to:

process and/or facilitate a processing of the one or more parameters to determine one or more results of at least one operation based, at least in part, on the one or more weighting values.

12. An apparatus of claim 11, wherein the apparatus is further caused to:

cause, at least in part, a rendering of one or more other representations of the one or more results in the user interface.

13. An apparatus of claim 12, wherein the apparatus is further caused to:

cause, at least in part, a monitoring of the user interface for one or more updates to the one or more manipulations, one or more other manipulations, or a combination thereof in at least substantially real time; and determine to update the one or more results, the rendering of the one or more other representations of the one or more results, or a combination thereof based, at least in part, on the monitoring.

14. An apparatus of claim 11, wherein the at least one operation includes, at least in part, a query.

15. An apparatus of claim 9, wherein the apparatus is further caused to:

determine one or more Boolean operators for the one or more parameters; and determine the mapping, the one or more weighting values, or a combination thereof based, at least in part, on the one or more Boolean operators.

16. An apparatus of claim 9, wherein the apparatus is further caused to:

determine the one or more manipulations based, at least in part, on one or more location sensors, one or more orientation sensors, one or more movements sensors, or a combination thereof of at least one device associated with the user interface.

* * * * *